United States Patent [19]
Gotesman et al.

[11] Patent Number: 5,930,525
[45] Date of Patent: Jul. 27, 1999

[54] METHOD AND APPARATUS FOR NETWORK INTERFACE FETCHING INITIAL AND DATA BURST BLOCKS AND SEGMENTING BLOCKS AND SCHEDULING BLOCKS COMPATIBLE FOR TRANSMISSION OVER MULTIPLE VIRTUAL CIRCUITS

[75] Inventors: Joel Gotesman, Sunnyvale; Jen Ming Chai, Milpitas, both of Calif.

[73] Assignee: Adaptec, Inc., Milpitas, Calif.

[21] Appl. No.: 08/846,355

[22] Filed: Apr. 30, 1997

[51] Int. Cl.⁶ ................................................. G06F 13/00
[52] U.S. Cl. ..................... 395/850; 395/826; 395/828; 395/855; 395/877
[58] Field of Search ............................... 370/252, 414, 370/474, 397, 231, 399; 395/188.01, 200.8, 221, 800.28, 850, 826, 828, 855, 877; 704/208

[56] References Cited

U.S. PATENT DOCUMENTS

| | | | |
|---|---|---|---|
| 5,359,568 | 10/1994 | Gaytan et al. | 365/221 |
| 5,491,691 | 2/1996 | Shtayer et al. | 370/61 |
| 5,495,478 | 2/1996 | Wilkinson et al. | 370/399 |
| 5,535,201 | 7/1996 | Zheng | 370/231 |
| 5,574,933 | 11/1996 | Horst | 395/800.28 |
| 5,579,312 | 11/1996 | Regache | 370/60.1 |
| 5,619,500 | 4/1997 | Hiekali | 370/414 |
| 5,619,502 | 4/1997 | Kahn et al. | 370/397 |
| 5,623,494 | 4/1997 | Rostoker et al. | 370/397 |
| 5,680,401 | 10/1997 | Gayton et al. | 370/474 |
| 5,712,851 | 1/1998 | Nguyen et al. | 370/399 |
| 5,751,951 | 5/1998 | Osborne et al. | 395/200.8 |
| 5,771,228 | 6/1998 | Seetharam et al. | 370/252 |
| 5,771,349 | 6/1998 | Picazo, Jr. et al. | 395/188.01 |
| 5,787,387 | 7/1998 | Aguilar | 704/208 |

OTHER PUBLICATIONS

Y. Suzuki, M. Nozaki, H. Ishida, H. Inoue and Y. Shiraishi "*Design of Traffic Shaper Function in the End System*", IEEE Nov. 14–16 (1995), Global Telecommunications Conf.—Singapore.

Unknown, "MB86687A Adaptation Layer Controller (ALC)", Aug. 1996, Version 2.0, pp. 1–6, Fujitsu Microelectronics, Ltd.

Unknown, "155 Mbps ATM SAR Controller for PCI–Based Networking Applications", Jan. 1996, pp. 1–26, Integrated Device Tech., Inc., Santa Clara, CA.

*Primary Examiner*—Thomas C. Lee
*Assistant Examiner*—Michael G. Smith
*Attorney, Agent, or Firm*—Martine Penilla & Kim, LLP

[57] ABSTRACT

Disclosed are methods and apparatuses for use with a host computer system that optimize the timing and sizing of data blocks that are part of an ATM PDU that is to be transmitted over an ATM network. The data blocks are transferred from the host's memory to a local memory in a network interface circuit. The network interface circuit includes a memory access circuit, a segmenting circuit, a local memory, and a scheduling circuit. The memory access circuit accesses the host's memory and fetches an initial size block of a data packet therefrom and supplies the block of the data to the segmenting circuit which segments the block of the data into a plurality of linked cells. The plurality of linked cells are then stored in the local memory. The scheduling circuit retrieves the linked cells in a predetermined order and transmits each of them over a network connection at a specific time. When the remaining number of the stored plurality of linked cells falls below a defined level, the scheduling circuit requests that the memory access circuit fetch subsequent or burst size block of the data packet. This process continues until such time as all of the data packet has been transmitted over the network connection.

28 Claims, 3 Drawing Sheets

METHOD AND APPARATUS FOR NETWORK INTERFACE FETCHING INITIAL AND DATA BURST BLOCKS AND SEGMENTING BLOCKS AND SCHEDULING BLOCKS COMPATIBLE FOR TRANSMISSION OVER MULTIPLE VIRTUAL CIRCUITS

CROSS REFERENCE TO RELATED APPLICATIONS

This application is related to the following U.S. patent applications: (1) Ser. No. 08/846,706 filed on the same day as the instant application, and entitled Methods and Apparatuses for Scheduling ATM Cells, and (2) Ser. No. 08/846,707 filed on the same day as the instant application, and entitled Programmable Reassembly Of Data Received in an ATM Network. These applications are hereby incorporated by reference.

BACKGROUND OF THE INVENTION

1. Field of the Invention

This invention relates generally to data communications and the interface between a computer system and a network, and more particularly to methods and apparatuses for efficiently transmitting an asynchronous Transfer Mode (ATM) protocol data unit (PDU) over a network.

2. Description of the Related Art

ATM configured networks allow for high-speed data, voice and video communications to be conducted between endpoint computer systems. ATM networks, which are based on the transmission of fixed-length data packets, have proven to be extremely useful because they combine the benefits of both a switched network (e.g., constant transmission delay, guaranteed capacity) and a packet switched network (e.g., flexibility and efficiency for intermittent traffic).

Current ATM standards are defined by the International Telecommunication Union (ITU) ATM Forum specifications, which are hereby incorporated by reference. As is common in contemporary communications protocols, several protocol layers are used to functionally divide the communications task within an ATM network. The ATM protocol layers are similar in scope to the Open System Interconnection (OSI) reference model that is defined by the International Standardization Organization (ISO).

In ATM networks, a variable length PDU defines the data to be shared between higher protocol layers, such as the application layer software programs operating at the endpoint computer systems. A typical PDU includes the data to be shared along with additional header and trailer information. To transmit the PDU over an ATM configured network, each PDU is further divided into fixed-length transmission units, known as cells. A typical cell is 53 bytes long and includes a 5-byte header containing its' connection identifier and a 48-byte payload. Thus, for example a 480-byte PDU would be divided into ten cells, each cell having a 48 byte payload or one tenth of the PDU.

During transmission, a cell is sent from one endpoint computer system to another through a virtual circuit (VC) within the interconnecting ATM network. A VC typically consists of a concatenation of communication links established between the two endpoints where higher layer protocols are accessed. By definition, ATM cells are transmitted in a sequence over an established VC. As such, the VC must exist throughout the transmission of a PDU. One of the advantages of an ATM configured network is that a number of VCs can be established over a single wire or fiber connecting the sending computer system to the network by time-division multiplexing the cells from different PDUs.

Typically, an ATM Network Interface Card (NIC) and accompanying software are provided within the sending (or receiving) endpoint computer systems to transmit (or receive) the cells of a PDU over a VC. In terms of the OSI reference protocol model, a typical NIC provides link layer functionality by supplying cells in a specific sequence to the physical layer of the ATM network. In contrast, the VCs within the ATM network are typically established at a higher level layer, as are the PDUs and information therein.

FIG. 1a is a block diagram illustrating a typical ATM network having a first endpoint computer labeled host 12, a network 14, and one or more additional endpoint computers labeled end stations 16. Within network 14 there are illustrated, by way of dashed connecting lines, a plurality of virtual circuits 18 that represent the communication channels established between host 12 and end stations 16 during an ATM communication. By way of example, network 14 may include one or more telecommunications and/or data networks, having switching devices, routing devices, and dedicated communication lines and/or fibers that are capable of providing a communication link between host 12 and end stations 16. Host 12 and end stations 16 may, for example, be personal computer systems, workstations, mainframes, or other like processing devices that are capable of sending and receiving ATM PDUs.

FIG. 1b is a block diagram that illustrates one possible configuration of an endpoint computer system, such as host 12 in FIG. 1a, having a processor 20, a host bus 22, a system memory 24, a PCI controller 26, a PCI bus 28, a NIC 30, and an optional SCSI interface (I/F) 32 and SCSI device 34. Processor 20 can for example be a microprocessor or central processing unit (CPU) configured to access system memory 24. System memory 24 can for example be a dynamic random access memory (DRAM) that is accessed via host bus 22, or by way of another interconnecting circuit. SCSI device 34 can for example be a secondary data storage device, such as a disc drive unit, that can be accessed by processor 20 by way of host bus 22, PCI controller 26, PCI bus 28, and SCSI interface 32. As shown, processor 20 can also access network 14 by way of PCI bus 28 and NIC 30. It is recognized that additional processors and other devices and additional buses, etc., can be connected to either the host bus or PCI bus, as is common in modern computing configurations.

In a typical endpoint computer system, when the higher level protocol and/or application layers require a PDU to be transmitted over network 14 to another endpoint computer system several process steps typically occur. First, a VC is typically established by processor 20 via NIC 30. Next, the PDU is stored in system memory 24 by processor 20. Following that, NIC 30 is directed by processor 20 to complete the desired PDU transmission.

Thus, in order to complete the transmission of the PDU, in a typical configuration, NIC 30 needs to fetch the PDU data, segment it to cells, and transmit these cells, one-by-one, over a VC in network 14. As such, one important consideration in the design and operation of a NIC and associated software is the transferring (i.e., fetching) of the PDU from the memory to the NIC.

Conventional NICs can be divided into one of three groups based upon their fetching methods. The first fetching method typically includes an internal sequencer that determines the order in which the cells are to be transmitted. The cells are then fetched one at a time from host memory, stored in an on-chip first-in-first-out (FIFO) buffer, and eventually transmitted in the same order as originally fetched. This type of fetching is used, for example, in the IDT77201 available from Integrated Device Technology of Santa Clara Calif. While this type of operation tends to reduce the amount of memory required on the NIC it also tends to place an unacceptable load that burdens the interconnecting devices and buses which are required during the sequential fetching of cells from memory.

The second fetching method attempts to reduce the burden on the interconnecting devices and buses by providing enough memory on-board the NIC to store a complete PDU. Thus, with this type of NIC the entire PDU is transferred from the host memory to the on-board memory during a one time fetching cycle. This type of fetching is used, for example in the ANA-5930 series of products available from Adaptec, Inc. of Milpitas, Calif. Although this type of NIC works well at reducing the burden by minimizing the amount of time required to fetch the PDU, the amount of on-board memory required to support a plurality of VCs (i.e., simultaneously storing a plurality of PDUs) may reduce the overall effectiveness of the NIC, and/or greatly increase the NIC's cost, power consumption and size.

The third fetching method relies on the host's processor to establish and maintain a linked list of cells to be transmitted for each VC, and to continuously or periodically interface with the NIC in completing the transfer of the PDU to the NIC at the correct times. This type of fetching is supported, for example, by the MB86684 Integrated Terminal Controller available from Fujitsu, Inc. of San Jose, Calif. Unfortunately, this type of continuous or periodic operation tends to increase the burden on both the host's processor and the interconnecting devices and buses which may be further tied-up during the transferring and processing/updating operations.

Thus, what is desired are improved methods and apparatuses that effectively reduce the "fetching burden" on the interconnecting devices and buses, and/or the host's processor, while also minimizing the amount of on-board memory required for the NIC.

SUMMARY OF THE INVENTION

The present invention provides improved methods and apparatuses, for use with a host computer system, that effectively reduce the "fetching burden" on the host's processor, interconnecting devices and buses by optimizing the size of the blocks of data fetched that are from the host's memory, and carefully timing when these blocks of data are fetched. When embodied in a network interface card (NIC) or similar circuitry, the methods and apparatuses of the present invention also tend to minimize the amount of on-board memory required by the NIC, and increase the number of VCs that are capable of being supported at the same time.

In accordance with one aspect of the present invention there is provided an apparatus for use with a computer system. The computer system having a first memory capable of storing at least one data packet. The data packet includes a plurality of data payloads that are to be transmitted over a network connection.

In accordance with one embodiment of the present invention, the apparatus is a network interface circuit that has a memory access circuit, a segmenting circuit, a second memory, and a scheduling circuit. The memory access circuit is capable of being coupled to the first memory and configured to access the first memory and fetch a block of the data packet from the first memory. The memory access circuit supplies the block of the data packet to the segmenting circuit.

The segmenting circuit is coupled to the memory access circuit and configured to segment the block of the data packet received therefrom into a plurality of linked cells. The segmenting circuit outputs the plurality of linked cells to the second memory. The second memory stores the plurality of linked cells and is configured to be accessed by the scheduling circuit.

The scheduling circuit is coupled to the memory access circuit, the segmenting circuit, and the second memory circuit. The scheduling circuit is configured to retrieve each of the plurality of linked cells in a predetermined order from the second memory. The scheduling circuit is further capable of being coupled to the network connection and configured to transmit each of the plurality of linked cells over the network connection. The scheduling circuit can also request that the memory access circuit fetch another the block of the data packet from the first memory when a remaining number of the plurality of linked cells stored in the second memory falls below a defined level. As such, the scheduling circuit will continue the transmit linked cells and request that the memory access circuit fetch another the block of the data packet from the first memory until such time as all of the plurality of data payloads within the data packet have been transmitted over the network connection.

In accordance with one embodiment of the present invention, the network interface circuit can be configured for use in transmitting a plurality of data packets over a corresponding plurality of network connections at about the same time. In accordance with yet another embodiment of the present invention, the block of data fetched can be programmably set to one or more values specifying an amount of the data packet to be fetched. In accordance with other embodiments, the defined level can be programmably set to a particular value for each VC.

In accordance with yet another embodiment of the present invention, the segmenting circuit can be further configured to create and update a linked list which specifies the predetermined order for transmitting each of the plurality of linked cells for the data packet.

In accordance with one aspect of the present invention there is provided a computer system capable of transmitting a data packet over a network connection. The computer system includes a processor, a first memory and a network interface circuit.

In accordance with another aspect of the present invention there is provided a method for transmitting a data packet having a plurality of data payloads, over a network connection. The method includes storing the data packet in a first memory with a first circuit. The method then includes fetching a block of the data packet from the first memory, segmenting the block of the data packet into a plurality of linked cells, storing the plurality of linked cells in a second memory, and transmitting the plurality of linked cells in a predetermined order over the network connection, with a second circuit.

The method further includes repeating the transmitting step until the plurality of linked cells stored in the second memory falls below a defined level. When the plurality of linked cells stored in the second memory falls below a defined level, the method includes repeating the steps of fetching, segmenting, storing, and transmitting, until such time as all of the data packet has been transmitted over the network connection.

BRIEF DESCRIPTION OF THE DRAWINGS

The invention, together with further objects and advantages thereof, may best be understood by reference to the following description taken in conjunction with the accompanying drawings in which:

FIG. 2 is a block diagram illustrating an improved network interface circuit for use in a network interface card (NIC), in accordance with one embodiment of the present invention, that can be used, for example in an endpoint computer as in FIG. 1b, as an interface to a network such as for example an ATM network as in FIG. 1a;

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

The present invention provides improved methods and apparatuses for use in a NIC that effectively reduce the "fetching burden" on the interconnecting devices and buses, and the host's processor by optimizing the amount (i.e., size) of the block of data fetched from the host memory, and carefully controlling when the block of data is fetched. In doing so, the methods and apparatuses of the present invention also tend to minimize the amount of on-board memory required by the NIC, and increase the number of VCs that are capable of being supported at the same time.

By way of example, in accordance with one embodiment of the present invention, there is provided a network interface circuit for use in a network interface card (NIC) that can be used to connect a computer system to a network, such as for example an ATM network. The NIC reduces the burden placed on the interconnecting devices and buses and on the host's processor, by fetching specially-sized blocks of the PDU at specific times.

Thus, in accordance with one embodiment of the present invention, the amount of data fetched by the NIC can be programmable and based upon the type of PDU and transmitting VC. For example, the NIC may transfer an initial size block of the PDU when the VC is new and a burst size block of data of the remaining PDU at a later time while the VC is open and transmitting the initial block. To increase efficiency, the size of the initial and burst blocks may vary from one another, and from VC to VC depending upon the type of PDU and VC.

Additionally, in accordance with one embodiment of the present invention, the timing of a fetch cycle, for an open VC, can be optimized by monitoring the status of the VC and/or the status of the cells awaiting transmission. For example, the NIC may wait until a certain programmable threshold or watermark level has been reached in transmitting the initial block of the PDU before an additional burst block is fetched from the host memory. As such, the amount of local memory on-board the NIC may be reduced.

Figure 1A:
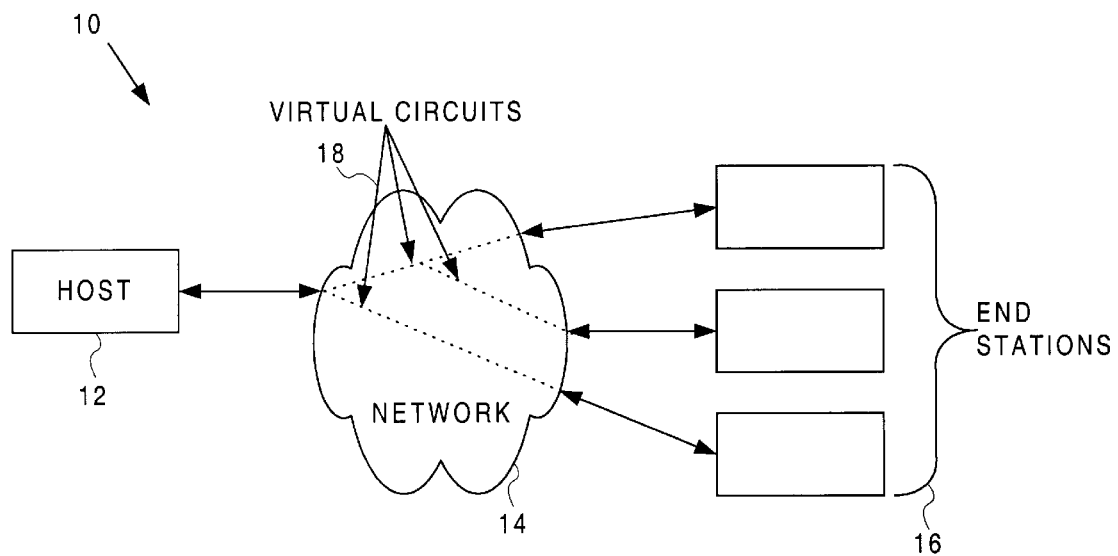
FIG. 1a is a block diagram illustrating a typical ATM network having a first endpoint computers a network and several additional endpoint computers.
Figure 1B:
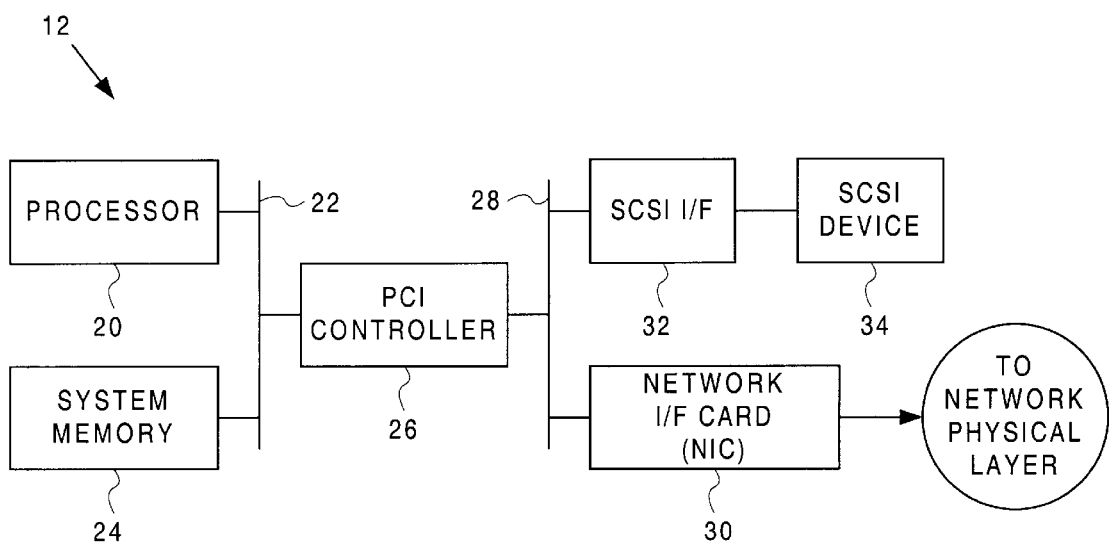
FIG. 1b is a block diagram illustrating a typical endpoint computer as in FIG. 1a, having a network interface card (NIC)
Figure 2:
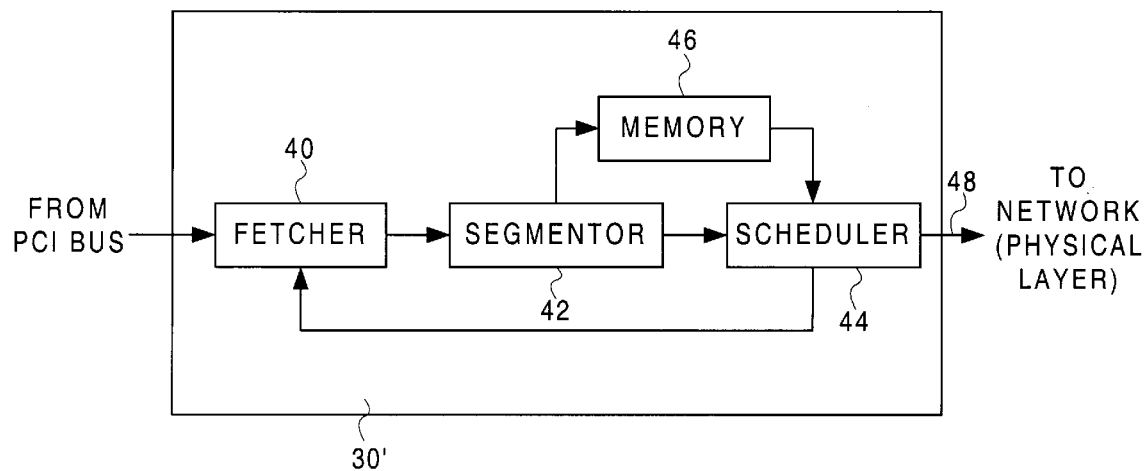

With this in mind, FIG. 2 is a block diagram illustrating an improved network interface card (NIC) 30', in accordance with one embodiment of the present invention. NIC 30' can be used for example within an endpoint computer, as illustrated in FIG. 1b, to interface with a network, such as for example an ATM network as illustrated in FIG. 1a.

Notice, however, that as illustrated in FIG. 2, NIC 30' only shows the functional blocks that are used in accordance with one embodiment of the present invention to support transmitting data cells. Not shown, in FIG. 2, are the additional functional blocks that may be used, for example, in receiving data cells, and in establishing and maintaining the physical layer connectivity with the network itself. As such, those skilled in the art will recognize that additional functionality can be embodied in the NIC.

As shown in FIG. 2, NIC 30' includes a fetcher 40, a segmenter 42, a scheduler 44 and a memory 46. Fetcher 40 interfaces with PCI bus 28 and through PCI bus 28 is capable of communicating with processor 20 and system memory 24. Those skilled in the art will recognize that Fetcher 40 can be embodied in several different circuits including both digital and analog components and computer implemented instructions.

In its preferred embodiment, fetcher 40 includes programmable DMA circuitry, and interfacing circuitry for use in fetching blocks of data from system memory 24. Thus, fetcher 40 is essentially a memory access circuit that can be requested by another circuit, such as processor 20 or scheduler 44, to read specific blocks of data out of memory 24 and provide the data blocks to segmenter 42. As mentioned, fetcher 40 may include interfacing circuitry (not shown) such as for example a temporary FIFO buffer that is configured to hold at least a portion of the fetched data block while awaiting processing by segmenter 42.

As further shown in FIG. 2, segmenter 42, which is coupled to fetcher 40, is configured to segment the fetched data block as received from fetcher 40 into a plurality of cells. By way of example, for an ATM transmission, segmenter 42 will segment the fetched block into 48-byte payloads and add a 5-byte header containing a connection identifier to produce a cell suitable for transmission over a VC.

Once a cell has been produced, segmenter 42 stores the cell in a slot (not shown) defined within memory 46. In segmenting and storing the cells associated with a PDU, segmenter 42 also produces a linked list (not shown) that links each cell to the next preceding and subsequent cells (already fetched), if any, within the PDU. Once linked, these cells become linked cells.

Memory 46 is coupled to segmenter 42 and is configured to store a plurality of linked cells in defined slots. In its preferred embodiment, memory 46 is a static random access memory (SRAM) that can be programmably configured and is about 128 Kbytes to 2 Mbytes in size. It is, however, recognized that memory 46 can include any type of memory circuit and can be increased or decreased in size as required for a specific application.

In other embodiments, either segmenter 42 and/or memory 46 can function to manage the slots defined within memory 46. By way of example, segmenter 42 may be required to locate the address or location of the next available slot within memory 46. Similarly, once scheduler 44 has transmitted the cell within a slot, or otherwise emptied a slot, it may be required to communicate to either segmenter 42 and/or memory 46 that the slot is now available for re-use.

As shown in FIG. 2, scheduler 44 is coupled to fetcher 40, segmenter 42 and memory 44. As alluded to above, scheduler 44 is tasked with retrieving cells from memory 46, for example based on a linked list of cells, and scheduling the cells for transmission over network 14 at specific times. Thus, scheduler 44 can include processing circuitry and an associated computer implemented instruction set along with additional interfacing circuitry as required to interface with the fetcher 40, segmenter 42, memory 44, and network 14. In its preferred embodiment, scheduler 44 includes a RISC processor with computer implemented instructions, along with memory, logic and interface circuitry.

In accordance with one embodiment of the present invention, once segmenter 42 has stored cells to memory 46 for transmission over a VC, segmenter 42 will communicate to scheduler 44 that the VC has cells stored within memory 46 which can be transmitted. Scheduler 44 can then determine the most appropriate time to transmit cell. Scheduler 44 also monitors or otherwise identifies when the number of linked cells stored in memory 46, for a VC, falls below a programmable watermark level. Once the watermark level has been reached, scheduler 44 provides a feedback signal to fetcher 40 that directs fetcher 40 to fetch another block of data from system memory 24. Those skilled in the art will recognize that additional functions may be included within scheduler 44, such as for example scheduler 44 may also generate, schedule, transmit, and/or receive cells that ate associated with maintaining the VC through network 14, in accordance with the ATM protocols.

In other embodiments, the watermark level and associated monitoring of the number of cells in memory 46, by scheduler 44, are not necessarily limited to a particular VC and/or PDU. Instead, scheduler 44 may monitor all of memory 46 or one or more portions thereof and communicate to either fetcher 40, segmenter 42, or both, that the monitored memory has reached the watermark level. Additionally, it is recognized that fetcher 40 can also be configured to fetch a block of data that includes data relating to more than one VC and/or PDU.

Figure 3:
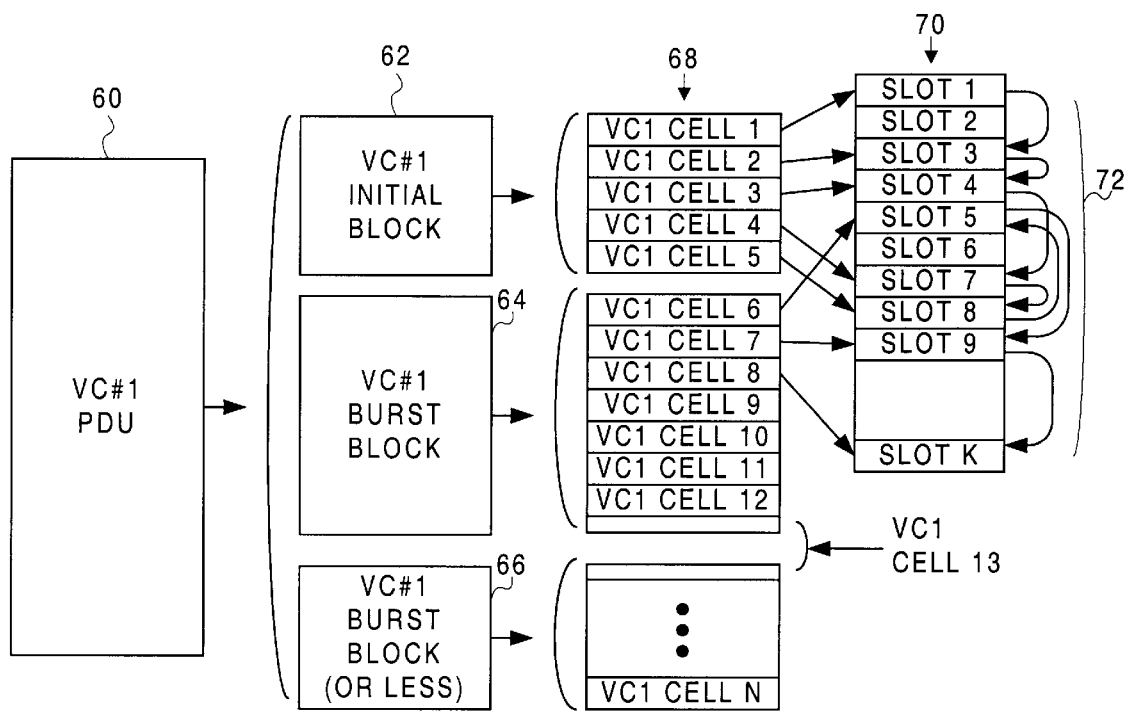
FIG. 3 is a block diagram illustrating a data packet in the form of a PDU, and the results of fetching and segmenting the PDU by way of a network interface circuit as in FIG. 2 in accordance with one embodiment of the present invention.

To further illustrate the data manipulations associated with fetcher 40, segmenter 42, scheduler 44, and memory 46, FIG. 3 will now be considered. FIG. 3 is a block diagram illustrating a data packet in the form of a PDU 60 that can be stored for example in system memory 24, and the results of fetching and segmenting the PDU by way of a NIC30', in accordance with one embodiment of the present invention.

As shown, fetcher 40 fetches an initial block 62 of data from PDU 60. Initial block 62 (which may be expressed in a number of bytes) is then segmented into a plurality of cells 68 and stored in a plurality of slots 70 within memory 46, by segmenter 42. Additionally, the cells within slots 70 (e.g., slot 1 through slot "k") are linked together by a linking mechanism, such as for example a linked list 72 (i.e., represented here by arrows) that identify the ordering of cells associated with the same PDU and/or VC.

As shown in FIG. 3, the cell identified as VC 1 Cell 1, in cells 68, is stored in slot 1, of slots 70. Similarly, VC 1 Cell 2 is stored in slot 3 and VC 1 Cell 3 is stored in slot 4. Notice that some slots may be skipped over when VC 1 Cells 2 and 4 are stored in their respective slots. This illustrates that linked cells can be distributed throughout memory 46 and that they can be separated from one or more other linked cells associated other PDUs and/or VCs, etc. This is also illustrated by VC 1 Cell 6, which as shown will be stored back in slot 5, following the fetching and segmenting of a subsequent block of the PDU.

As illustrated in FIG. 3, the next fetching cycle brings in a burst block 64 of data from PDU 60. While burst block 64 is shown as being larger than initial block 60, it can be just as easily be smaller than or equal in size to initial block 62. Burst block 64 is segmented into VC 1 Cells 6 through 12, and a portion of VC1 Cell 13, and stored in slots 70 by segmenter 42.

Notice that only a portion of VC1 Cell 13 was included in burst 64, and as a result VC1 Cell 13 is not yet suitable for transmission by scheduler 44. The remainder of the payload required to complete VC1 Cell 13 will be fetched during the next fetching cycle, as depicted by burst block 66. Upon receiving a complete payload for VC1 Cell 13, VC1 Cell 13 will become a linked cell which is suitable for transmission, following of course processing by segmenter 42. Notice also that burst block 66 can be less than an entire burst size, as would occur when the remaining data in PDU 60 is less than the programmed size of the burst block.

Figure 4:
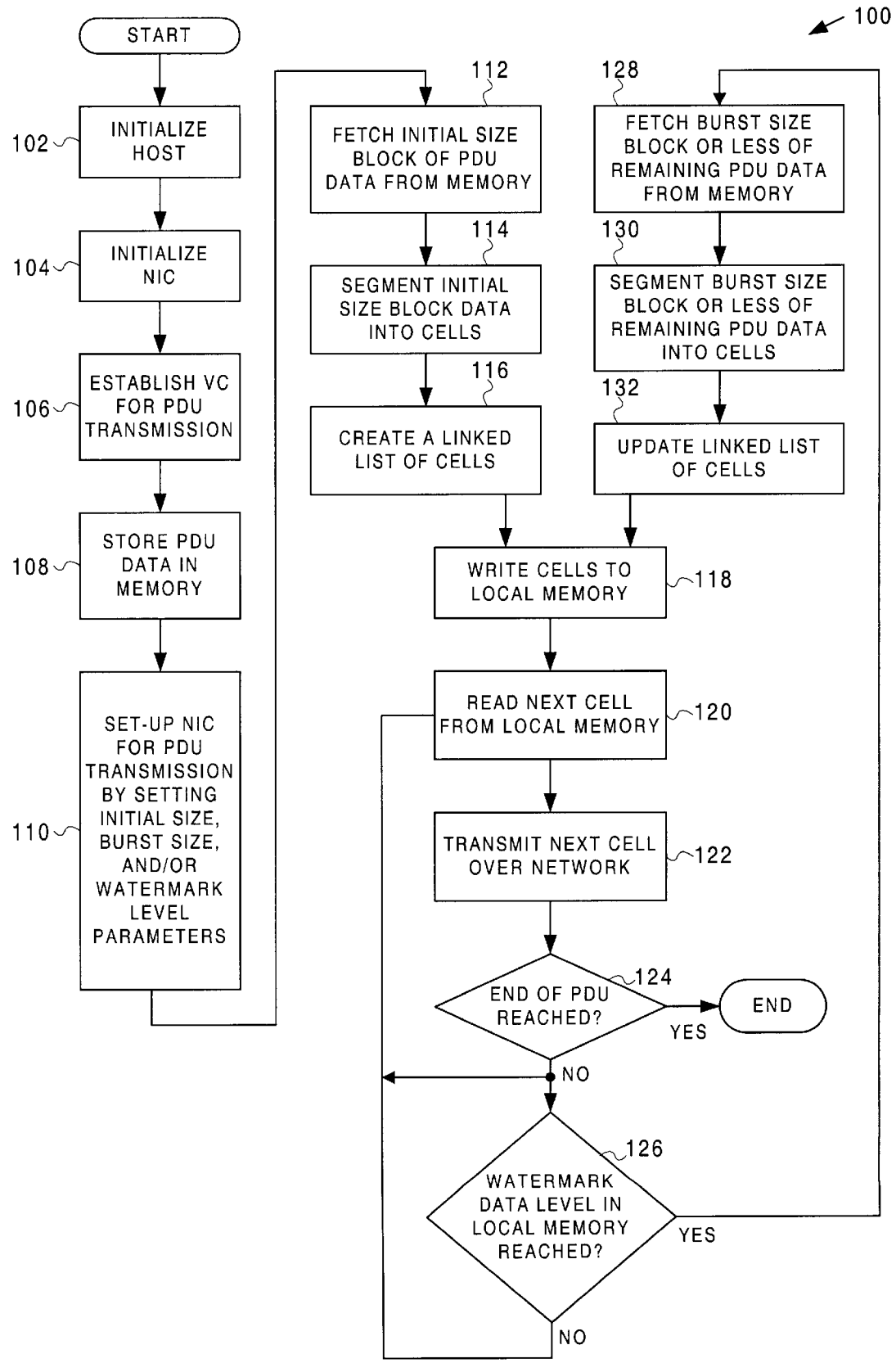
FIG. 4 is a flow-chart illustrating a method in accordance with one embodiment of the present invention that can, for example, be embodied in a network interface circuit as in FIG. 2, and/or within associated software.

FIG. 4 is a flow-chart illustrating a method 100 for transmitting a data packet having a plurality of data payloads over a network connection, in accordance with one embodiment of the present invention, that can for example be embodied in NIC 30' of FIG. 2, and/or within associated computer implemented instructions and additional processing and logic circuitry.

As shown, method 100 includes step 102 wherein the host computer system or endpoint computer system and software are initialized. Step 102 can, for example, include booting up an operating system program, connecting/configuring the system and connected devices, etc. Next, step 104 includes initializing the NIC, which can include the "booting-up" of operating programs and related driver programs, and connecting/configuring the NIC and connected devices, etc.

Once the host and NIC are running, method 100 includes step 106 wherein the host and NIC are configured such that a VC is established for use in transmitting a PDU from the host to another computer system over the network. Step 106 can, by way of example, include connecting a physical layer interface in either the computer system, NIC, or other device to a network server, router, or switch over a line, wire, and/or fiber.

Having established a VC in step 106, method 100 includes generating, assembling, or simply providing by way of the computer system (or attached circuit) a PDU, and storing at least a portion of the PDU in the system memory or other storage medium within or connected to the computer system.

Once the type of PDU has been established in step 108 and at least a portion of it stored in memory, method 100 includes step 110 wherein the NIC is set-up or otherwise made aware of one or more programmable variables relating to the fetching cycle in accordance with one or more of the embodiments of the present invention.

As shown in FIG. 4, step 110 the host provides one or more of an initial size, a burst size, or a watermark level for use with the PDU. The initial size represents the amount of PDU data to be fetched by the NIC during the initial fetching cycle. This amount can be the entire PDU or a portion thereof. The burst size represents the amount of PDU data to be fetched by the NIC during subsequent fetching cycles following the initial cycle. The watermark level represents and indicator that establishes the point at which subsequent fetching cycles are to be conducted, based upon one or more parameters associated with the cells awaiting transmission, the number of open slots in memory, and/or the status of a VC.

The initial fetching cycle begins in step 112 wherein the NIC fetches an initial size block of PDU data from storage in the computer. This can, for example, include gaining access to one or more buses such as a PCI bus and/or a host bust through one more interconnected circuits/devices. Note that the type, including location, of the PDU was established in step 108 and provided to the NIC in step 110.

Next, in step 114 the initial size block is segmented into cells based on a plurality of payloads within the PDU. Once segmented, additional information in the form of data can be added to the payload to create a linked cell in step 116. By way of example, an identifier may be added to the payload to identify the sender and/or receiver, and a CRC or other form of security mechanism may be added as well. A linking mechanism is created in step 116 for use in keeping the cells in a predetermined order during transmission. By way of example, a linked list, table, counter, pointer or similar mechanism can be generated and provided for use in retrieving, scheduling and/or transmitting cells. The last of the linked cells, i.e., the last payload of the PDU, can also be identified or otherwise marked as the last cell for a PDU by way of the linking mechanism.

The linked cells created in step 118 are then stored in a local memory on-board the NIC. Preferably, the memory can be logically divided into slots and one cell can be stored in each slot. It is recognized, however, that other memory configurations can also be used.

In step 120 the first or next linked cell is retrieved or read from the local memory. Next, in step 122, the next cell, in accord with the linking mechanism of step 116, is transmitted over the network at a specific time through a VC using the network's protocols and standards.

At step 124, method 100, includes a decision point wherein it is determined if the entire PDU has been transmitted. This can for example be determined by way of the linking mechanism of step 116 or by some other signaling mechanism, such as a particular data sequence, bit code, or flag. If the entire PDU has been transmitted then method 100 ends. If the entire PDU has not been transmitted then method 100 continues to steps 126 and returns to step 120. Step 120 proceeds to read and transmit the next linked cell, if available, or waits for additional linked cells to be made available.

Step 126 is an iterative decision point wherein, for example, the level or number of the currently linked cells awaiting transmission for the PDU are compared to the watermark level for the PDU and/or VC. If the watermark level has not been reached then method 100 returns to step 120 and proceeds to read and transmit the next linked cell. When the watermark level has been reached then method 100 proceeds to step 128.

Step 128 is the beginning of a subsequent fetching cycle wherein a burst size block of the remaining PDU is fetched from the computer system. Step 128 is similar, therefore, to step 112. Next, in step 130, the burst block is segmented as was the initial block in step 114. In step 132 the linking mechanism, such as a linked list of cells, is updated to include the cells segmented from the burst block in step 130. Notice that step 132 is similar to step 116. After step 132, method 100 returns to step 118 and method 100 continues in this manner until such a point as the end of the PDU is reached in step 124, upon which method 100 ends.

While this invention has been described in terms of several preferred embodiments, there are alterations, permutations, and equivalents which fall within the scope of this invention. For example, the apparatuses and methods of the present invention may be applied to other non-ATM configured networks and/or data transferring systems. It should also be noted that there are may alternative ways of implementing both the process and apparatus of the present invention. It is therefore intended that the following appended claims be interpreted as including all such alterations, permutations, and equivalents as fall within the true spirit and scope of the present invention.

What is claimed is:

1. A network interface circuit for use with a computer system having a first memory capable of storing a data packet having a plurality of data payloads awaiting transmission over a network connection, said network interface circuit comprising:

a memory access circuit capable of being coupled to said first memory and configured to access said first memory and fetch a block of said data packet from said first memory, such that said block is less than the data packet and more than a single one of the plurality of data payloads;

a segmenting circuit coupled to said memory access circuit and configured to segment said block of said data packet received therefrom into a plurality of linked cells, and to output said plurality of linked cells;

a second memory coupled to said segmenting circuit and configured to store said plurality of linked cells, the plurality of linked cells being arranged in a manner that is compatible with a transmission of data for multiple virtual circuits over the network connection; and a scheduling circuit coupled to said memory access circuit, said segmenting circuit, and said second memory circuit, and configured to retrieve each of said plurality of linked cells in a predetermined order from said second memory, and capable of being coupled to said network connection and configured to transmit each of said plurality of linked cells over said network connection, and to request that said memory access circuit fetch another said block of said data packet from said first memory when a remaining number of said plurality of linked cells stored in said second memory falls below a defined level until such time as all of said plurality of data payloads within said data packet have been transmitted over said network connection;

wherein the block is an initial block for initializing the scheduling circuit of the network interface circuit when it is a first block fetched and the block is a data burst programmed for a selected virtual circuit when it is other than the first block fetched.

2. The network interface circuit as recited in claim 1 wherein said memory access circuit, said segmenting circuit, said second memory, and said scheduling circuit are further configured for use in transmitting a plurality of data packets over a corresponding plurality of virtual circuit network connections at about the same time.

3. The network interface circuit as recited in claim 1 wherein said block is programmably set to one or more values specifying an amount of said data packet to be fetched for the initial block and the following data bursts.

4. The network interface circuit as recited in claim 1 wherein said defined level is programmably set to a particular value for said data packet, and said data packet is a variable length PDU.

5. The network interface circuit as recited in claim 1 wherein said segmenting circuit is further configured to create and update a linked list which specifies said predetermined order for transmitting each of said plurality of linked cells for said data packet.

6. The network interface circuit as recited in claim 1 wherein said second memory can be divided into a plurality of slots, wherein each of said plurality of slots can store one of said data cells.

7. The network interface circuit as recited in claim 6 wherein said segmenting circuit further includes a slot manager configured to identify when said second memory has one or more open slots from among said plurality of slots.

8. The network interface circuit as recited in claim 1 wherein said memory access circuit further includes a buffer circuit for storing at least a portion of said block of said data packet.

9. The network interface circuit as recited in claim 1 wherein said memory access circuit further includes a DMA engine configured to access said first memory.

10. The network interface circuit as recited in claim 1 wherein said memory access circuit is further capable accessing said first memory over a PCI interface.

11. The network interface circuit as recited in claim 1 wherein said second memory is a static random access memory (SRAM).

12. The network interface circuit as recited in claim 11 wherein said static random access memory (SRAM) is between about 128 kilobytes and about 2 Megabytes in size.

13. The network interface circuit as recited in claim 11 wherein said static random access memory (SRAM) is greater than about 2 Megabytes in size.

14. The network interface circuit as recited in claim 1 wherein said scheduling circuit further includes a buffer capable of storing at least one of said plurality of linked cells.

15. The network interface circuit as recited in claim 1 wherein said scheduling circuit further includes a RISC processor and scheduling computer implementing instructions that define when to transmit each of said plurality of linked cells over said network connection and when to request that said memory access circuit fetch another said block of said data packet from said first memory.

16. A computer system capable of transmitting a data packet over a network connection, said computer system comprising:
   a processor configured to provide a PDU data packet having a plurality of data payloads;
   a first memory coupled to said processor and configured to store said PDU data packet;
   a network interface circuit comprising;
      a memory access circuit coupled to said first memory and configured to access said first memory and fetch a block of said PDU data packet from said first memory, said block is less than said PDU data packet and more than a single one of the plurality of data payloads;
      a segmenting circuit coupled to said memory access circuit and configured to segment said block of said PDU data packet received therefrom into a plurality of linked cells;
      a second memory coupled to said segmenting circuit and configured to store said plurality of linked cells in an arrangement that is compatible with a transmission of data for multiple virtual circuits over the network connection; and
      a scheduling circuit coupled to said virtual connection, said memory access circuit, said segmenting circuit, and said second memory circuit, and configured to retrieve each of said plurality of linked cells in a predetermined order from said second memory, transmit each of said plurality of linked cells over said network connection, and to request that said memory access circuit fetch another said block of said PDU data packet from said first memory when a remaining number of said plurality of linked cells stored in said second memory falls below a defined level until such time as all of said plurality of data payloads within said PDU data packet have been transmitted over said network connection;
   whereby said block is an initial block for initiating circuits of the network interface circuit when it is a first block fetched and the block is a data burst programmed for a selected one of the multiple virtual circuits when it is other than the first block fetched from the first memory.

17. The computer system as recited in claim 16 wherein said memory access circuit, said segmenting circuit, said second memory, and said scheduling circuit are further configured for use in transmitting a plurality of PDU data packets over a corresponding plurality of virtual circuit network connections at about the same time.

18. The computer system as recited in claim 16 wherein said block is programmably set to one or more values specifying an amount of said PDU data packet to be fetched for the initial block and the data burst.

19. The computer system as recited in claim 16 wherein said defined level is programmably set to a particular value for said PDU data packet which is of varying sizes.

20. The computer system as recited in claim 16 wherein said segmenting circuit is further configured to create and update a linked list which specifies said predetermined order for transmitting each of said plurality of linked cells for said PDU data packet.

21. The computer system as recited in claim 16 wherein said second memory can be divided into a plurality of slots, wherein each of said plurality of slots can store one of said data cells.

22. The computer system as recited in claim 21 wherein said segmenting circuit further includes a slot manager configured to identify when said second memory has one or more open slots from among said plurality of slots.

23. The network interface circuit as recited in claim 16 wherein said second memory is a static random access memory (SRAM).

24. A method for transmitting a data packet having a plurality of data payloads, over a multi-virtual circuit network connection, said method comprising:
   (a) with a first circuit, storing said data packet in a first memory;
   (b) with a second circuit;
      (i) fetching a block of said data packet from said first memory such that said block is less than said data packet and more than a single one of the plurality of data payloads, wherein an initial fetching obtains an initial size block of said data packet for initializing the second circuit, and any subsequent fetching obtains a data burst size block or less than the data burst size when at an end of the data packet, the data burst size block being progammable for a selected virtual circuit of the multi-virtual circuit network connection;

(ii) segmenting said block of said data packet into a plurality of linked cells;

(iii) storing said plurality of linked cells in a second memory;

(iv) transmitting said plurality of linked cells in a predetermined order that is compatible with simultaneous virtual circuit transmission over said multi-virtual circuit network connection;

(v) repeating (b)(iv), above, until said plurality of linked cells stored in said second memory falls below a defined level;

(vi) when said plurality of linked cells stored in said second memory falls below a defined level, repeating (b)(i–v), above, until such time as all of said data packet has been transmitted over said multi-virtual circuit network connection.

25. The method as recited in claim 24 wherein (a) and (b) are duplicated for use in transmitting a plurality of data packets designated for transmission over a corresponding plurality of virtual circuit network connections at about the same time.

26. The method in claim 24 wherein said segmenting of said initial block further comprises defining said predetermined order with a linked list that identifies a sequential ordering of said linked cells.

27. The method in claim 26 wherein said transmitting said plurality of linked cells further comprises:

identifying a next linked cell to be transmitted based on said linked list, and reading said next linked cell from said second memory.

28. The method in claim 24 wherein each of said plurality of linked cells includes at least a portion of one of said plurality of data payloads and wherein said transmitting said plurality of linked cells only is limited to only transmitting each of said plurality of linked cells that include one of said plurality of data payloads.

* * * * *